US011602977B2

(12) United States Patent
Kim et al.

(10) Patent No.: US 11,602,977 B2
(45) Date of Patent: Mar. 14, 2023

(54) HEAT PUMP SYSTEM FOR VEHICLE

(71) Applicants: HYUNDAI MOTOR COMPANY, Seoul (KR); KIA CORPORATION, Seoul (KR)

(72) Inventors: Jeawan Kim, Gwangmyeong-si (KR); Jae Yeon Kim, Hwaseong-si (KR); Yeonho Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 37 days.

(21) Appl. No.: 17/337,114

(22) Filed: Jun. 2, 2021

(65) Prior Publication Data

US 2022/0089000 A1 Mar. 24, 2022

(30) Foreign Application Priority Data

Sep. 24, 2020 (KR) .................. 10-2020-0123944

(51) Int. Cl.
*F25B 13/00* (2006.01)
*B60H 1/32* (2006.01)
*B60H 1/00* (2006.01)

(52) U.S. Cl.
CPC ....... *B60H 1/3213* (2013.01); *B60H 1/00278* (2013.01); *B60H 1/00485* (2013.01);
(Continued)

(58) Field of Classification Search
CPC .............. B60H 1/3213; B60H 1/00278; B60H 1/00485; B60H 1/3207; B60H 1/3227; B60H 2001/3285
(Continued)

(56) References Cited

U.S. PATENT DOCUMENTS

| 10,661,631 | B2  | 5/2020  | Kawano |              |
|------------|-----|---------|--------|--------------|
| 2018/0117985 | A1* | 5/2018 | Kim    | B60H 3/024   |
| 2019/0344636 | A1* | 11/2019 | Lee   | B60H 1/00885 |

FOREIGN PATENT DOCUMENTS

| EP | 2674695 A1    | 12/2013 |
|----|---------------|---------|
| JP | 2011-152808 A | 8/2011  |

(Continued)

*Primary Examiner* — Davis D Hwu
(74) *Attorney, Agent, or Firm* — McDonnell Boehnen Hulbert & Berghoff LLP

(57) ABSTRACT

A heat pump system for a vehicle includes an air conditioner circulating a refrigerant through a refrigerant line, a coolant circulation device circulating a coolant through a coolant line, a first chiller connected to the coolant circulation device through the coolant line, connected to the refrigerant line through a first refrigerant connection line, and heat-exchanges a selectively introduced coolant with a refrigerant supplied from the air conditioner to control a temperature of a coolant, and a second chiller connected to the coolant circulation device through the coolant line, connected to a second refrigerant connection line so that a refrigerant is supplied from the air conditioner, and increases a temperature of a refrigerant by heat-exchanging a coolant and a refrigerant so that waste heat is recovered from a coolant selectively flowing thereinto, wherein the air conditioner includes a gas injection part that bypasses some of a refrigerant passing through a condenser to a compressor to increase a flow rate of a refrigerant circulating in the refrigerant line.

19 Claims, 5 Drawing Sheets

(52) U.S. Cl.
CPC ......... *B60H 1/3207* (2013.01); *B60H 1/3227* (2013.01); *B60H 2001/3285* (2013.01)

(58) Field of Classification Search
USPC .......................................................... 62/160
See application file for complete search history.

(56) References Cited

FOREIGN PATENT DOCUMENTS

| | | |
|---|---|---|
| JP | 2015-063169 A | 4/2015 |
| KR | 10-1558314 B1 | 10/2015 |
| KR | 2020-0040432 A | 4/2020 |
| KR | 20200053724 * | 5/2020 |

* cited by examiner

HEAT PUMP SYSTEM FOR VEHICLE

CROSS REFERENCE TO RELATED APPLICATIONS

This application claims priority to and the benefit of Korean Patent Application No. 10-2020-0123944 filed in the Korean Intellectual Property Office on Sep. 24, 2020, the entire contents of which are incorporated herein by reference.

BACKGROUND

(a) Field

The present disclosure relates to a heat pump system for a vehicle, and more particularly, to a heat pump system for a vehicle that may control a temperature of a battery module by using one chiller in which a refrigerant and a coolant are heat-exchanged, and that may improve heating efficiency by using another chiller that recovers waste heat from electrical components.

(b) Description of the Related Art

Generally, an air conditioner system for a vehicle includes an air conditioner for circulating a refrigerant to heat or cool an interior of the vehicle.

The air conditioner system, which may maintain a fresh indoor condition by maintaining an indoor temperature of a vehicle at an appropriate temperature regardless of an outdoor temperature change, is configured to heat or cool an interior of the vehicle by heat-exchange by a condenser and an evaporator during a process in which a refrigerant discharged by driving a compressor is circulated to the compressor again by passing through the condenser, a receiver drier, an expansion valve, and the evaporator.

That is, in the air conditioner system, a high-temperature and high-pressure gaseous refrigerant compressed by the compressor is condensed through the condenser, then is evaporated by the evaporator through the receiver drier and the expansion valve to lower the indoor temperature and humidity in a summer cooling mode.

Recently, as a concern about energy efficiency and environmental pollution has gradually increased, development of an environmentally-friendly vehicle capable of being substantially substituted for a vehicle having an internal combustion engine has been required, and the environmentally-friendly vehicles are typically classified into an electric vehicle which is typically driven using a fuel cell or electricity as a power source, and a hybrid vehicle which is driven using an engine and an electric battery.

In the electric vehicle and the hybrid vehicle of the environmentally-friendly vehicles, a separate heater is not used, unlike an air conditioner of a general vehicle, and an air conditioner, which is applied to the environmentally-friendly vehicle, is typically referred to as a heat pump system.

In a case of the electric vehicle using the fuel cell, chemical reaction energy of oxygen and hydrogen is converted into electrical energy to generate driving force, and during this process, heat energy is generated by chemical reaction in the fuel cell, and as a result, effective removal of the generated heat is required to secure the performance of the fuel cell.

Even in the hybrid vehicle, the driving force is generated by driving the motor by using electricity supplied from the fuel cell or the electric battery together with the engine that is actuated with a general fuel, and as a result, the performance of the motor can be secured only by effectively removing the heat generated from the fuel cell or the battery, and the motor.

Accordingly, in a hybrid vehicle or electric vehicle in a prior art, a battery cooling system, a cooling part, and a heat pump system should be configured to have respective separate circuits to prevent heat generation of a motor, an electrical component, and a battery including a fuel cell.

Thus, a size and a weight of a cooling module disposed in the front of the vehicle are increased, and a layout of connecting pipes for supplying a refrigerant or coolant to the heat pump system, the cooling part, and the battery cooling system inside an engine compartment becomes complicated.

In addition, since the battery cooling system for heating or cooling the battery is separately provided according to a state of the vehicle so that the battery may operate in an optimal state, a plurality of valves for connecting the respective connecting pipes are applied, thus noise and vibration are transmitted to the interior of the vehicle, resulting in poor ride comfort.

In addition, when heating the interior of the vehicle, the heating performance decreases due to a lack of a heat source, the amount of electricity consumption increases due to the use of an electric heater, and the power consumption of the compressor increases.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a heat pump system for a vehicle that may simplify a system by controlling a temperature of a battery module by using one chiller in which a refrigerant and a coolant are heat-exchanged.

In addition, the present disclosure has been made in an effort to provide a heat pump system for a vehicle that may improve heating efficiency by using another chiller that recovers waste heat from electrical components in a vehicle heating mode.

In addition, the present disclosure has been made in an effort to provide a heat pump system for a vehicle that may maximize heating performance by applying a gas injection part that selectively operates in a vehicle heating or dehumidifying mode to increase a flow rate of a refrigerant.

An embodiment of the present disclosure provides a heat pump system for a vehicle, including an air conditioner circulating a refrigerant through a refrigerant line, a coolant circulation device circulating a coolant through a coolant line, a first chiller that is connected to the coolant circulation device through the coolant line, connected to the refrigerant line through a first refrigerant connection line, and heat-exchanges a selectively introduced coolant with the refrigerant supplied from the air conditioner to control a temperature of the coolant, and a second chiller that is connected to the coolant circulation device through the coolant line, connected to a second refrigerant connection line so that the refrigerant is supplied from the air conditioner, and increases a temperature of the refrigerant by heat-exchanging the coolant and the refrigerant so that waste heat is recovered from the coolant selectively flowing thereinto, wherein the air conditioner includes a gas injection part that bypasses some of the refrigerant passing through a condenser to a compressor to increase a flow rate of the refrigerant circulating in the refrigerant line.

The air conditioner may include an HVAC module including an evaporator connected thereto through the refrigerant line, and an opening/closing door that selectively flows external air passing through the evaporator into a heater according to cooling, heating, and dehumidifying modes of the vehicle, the condenser that is connected to the coolant circulation device through the coolant line so that the coolant passes, and heat-exchanges the refrigerant supplied through the refrigerant line with the coolant, a compressor connected between the evaporator and the condenser through the refrigerant line, a heat-exchanger provided in the refrigerant line between the condenser and the evaporator, a first expansion valve provided in the refrigerant line connecting the heat-exchanger and the evaporator, a second expansion valve provided in the first refrigerant connection line, and an accumulator provided in the refrigerant line between the evaporator and the compressor.

One end of the first refrigerant connection line may be connected to the refrigerant line between the heat-exchanger and the first expansion valve, the other end of the first refrigerant connection line may be connected to the refrigerant line between the accumulator and the evaporator, one end of the second refrigerant connection line may be connected to the first refrigerant connection line through the refrigerant valve between the second expansion valve and the first chiller so that a refrigerant that has passed the heat-exchanger passes through the second chiller, and the other end of the second refrigerant connection line may be connected to the accumulator.

The second expansion valve may selectively expand the refrigerant that has passed through the heat-exchanger according to a mode of the vehicle to flow the refrigerant into the first refrigerant connection line or to pass the refrigerant through the first refrigerant connection line.

The gas injection part may include a gas-liquid separator provided in the refrigerant line between the condenser and the heat-exchanger, the gas-liquid separator being configured to separate and selectively discharge a gaseous refrigerant and a liquid refrigerant among the refrigerant that have passed through the condenser, a supply line connecting the gas-liquid separator and the compressor, the supply line being configured to selectively supply the gaseous refrigerant from the gas-liquid separator to the compressor, a control valve provided in the supply line, a third expansion valve provided in the refrigerant line between the condenser and the gas-liquid separator, and a fourth expansion valve provided in the refrigerant line between the gas-liquid separator and the exchanger.

When the gas injection part is operated in a heating mode of the vehicle, the third expansion valve may expand the refrigerant supplied from the condenser to supply the refrigerant to the gas-liquid separator, and the fourth expansion valve may expand the refrigerant supplied from the gas-liquid separator to flow the refrigerant into the refrigerant line.

When the gas injection part is not operated in a heating mode of the vehicle, the third expansion valve may pass the refrigerant supplied from the condenser, and the fourth expansion valve may expand the refrigerant that has passed through the gas-liquid separator to supply the refrigerant to the heat-exchanger.

When the gas injection part is not operated in a dehumidifying mode of the vehicle, the third expansion valve may pass the refrigerant supplied from the condenser, and the fourth expansion valve may pass the refrigerant that has passed through the gas-liquid separator to supply the refrigerant to the heat-exchanger.

When the gas injection part is operated in a dehumidifying mode of the vehicle, the third expansion valve may expand the refrigerant supplied from the condenser to supply the refrigerant to the gas-liquid separator, and the fourth expansion valve may selectively expand or pass the refrigerant that has passed through the gas-liquid separator according to presence or absence of refrigerant expansion in the first expansion valve.

In a cooling mode the vehicle, the third and fourth expansion valves may not expand the refrigerant supplied from the condenser, but may flow the refrigerant through the refrigerant line.

The control valve, when the gas injection part is operated, may operate so that the supply line may be opened.

The first, second, third, and fourth expansion valves may be electronic expansion valves that selectively expand the refrigerant while controlling flowing of the refrigerant.

The heat-exchanger may additionally condense or evaporate the refrigerant condensed in the condenser through heat-exchange with external air, according to a selective operation of the fourth expansion valve.

When a battery module is cooled in a cooling mode of the vehicle, the coolant circulation device may supply the coolant to the condenser and the first chiller through the coolant line connected to the condenser and the first chiller, in the air conditioner, in a state in which, through operations of the second expansion valve and the refrigerant valve occur, the first refrigerant connection line is opened and the second refrigerant connection line is closed, the refrigerant may be circulated along the refrigerant line and the first refrigerant connection line, the first and second expansion valves may expand the coolant so that an expanded refrigerant may be supplied to the evaporator and the first chiller, respectively, and the heat-exchanger may condense the refrigerant through heat-exchange with external air.

When recovering heat from an external heat source and waste heat from electrical components in a heating mode of the vehicle, the coolant circulation device may supply the coolant to the heater, the condenser, and the second chiller through the coolant line connected to the heater, the condenser, and the second chiller, the heater may be supplied with a coolant of increased temperature while passing through the second chiller and the condenser from the coolant circulation device, in the air conditioner, a refrigerant line connecting the heat-exchanger and the evaporator may be closed by the first expansion valve, a portion of the first refrigerant connection line connected to the first chiller may be closed by the refrigerant valve, and the second refrigerant connection line may be opened by the refrigerant valve, the second expansion valve may selectively expand the refrigerant to supply the refrigerant to the second chiller, the heat-exchanger may evaporate the refrigerant through heat-exchange with external air, and the gas injection part may be selectively operated.

In a dehumidifying mode of the vehicle, the coolant circulation device may supply the coolant to the heater and the condenser through the coolant line connected to the heater and the condenser, the heater may be supplied with a coolant of increased temperature while passing through the condenser from the coolant circulation device, in the air conditioner, in a state in which, through an operation of the second expansion valve, the first refrigerant connection line is closed, and the second refrigerant connection line is closed, the refrigerant may be circulated along the refrigerant line, the first expansion valve may expand the refrigerant so that the expanded refrigerant may be supplied to the evaporator, and the gas injection part may be selectively operated.

The heat-exchanger may selectively condense or evaporate the refrigerant that has passed the condenser according to whether the gas injection part is operated.

The gas injection part may include a plate-shaped heat-exchanger provided in the refrigerant line between the condenser and the heat-exchanger, a supply line that includes one end connected to the refrigerant line between the condenser and the plate-shaped heat-exchanger and an other end connected to the compressor through the plate-shaped heat-exchanger, a third expansion valve provided in the supply line at a front end of the plate-shaped heat-exchanger, and a fourth expansion valve provided in the refrigerant line between the plate-shaped heat-exchanger and the heat-exchanger.

The condenser may be a water-cooled heat-exchange; and the heat-exchanger may be an air-cooled heat-exchanger.

The gas injection part may selectively operate in a heating or dehumidifying mode of the vehicle.

As described above, according to the heat pump system for the vehicle according to the embodiment of the present disclosure, simplification of the system may be realized, by using one chiller in which a refrigerant and a coolant are heat-exchanged to control a temperature of a battery module according to a vehicle mode.

In addition, according to the heat pump system for the vehicle according to the embodiment of the present disclosure, it is possible to improve heating efficiency by using another chiller that recovers waste heat from electrical components in a vehicle heating mode and by selectively using an external heat source or the waste heat from the electrical components.

In addition, according to the embodiment of the present disclosure, by efficiently controlling a temperature of a battery module, it is possible to operate the battery module at optimal performance, and a total mileage of the vehicle may be increased through efficient management of the battery module.

In addition, according to the embodiment of the present disclosure, it is possible to maximize heating performance by selectively increasing a flow rate of refrigerant in a vehicle heating or dehumidifying mode by applying a gas injection part.

Furthermore, according to the embodiment of the present disclosure, it is possible to reduce manufacturing cost and weight through simplification of an entire system, and to improve space utilization.

DETAILED DESCRIPTION

Figure 1:
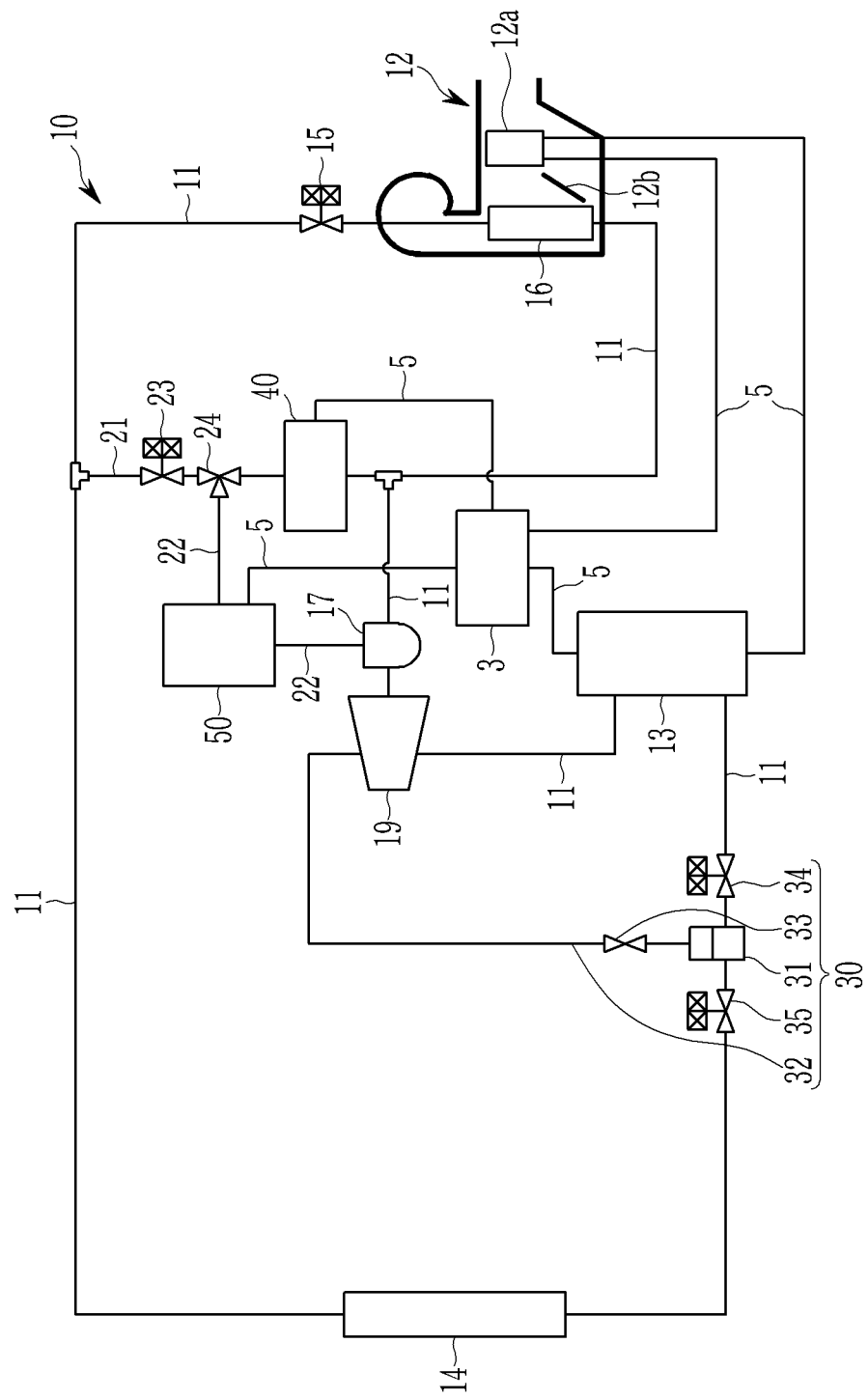
FIG. 1 illustrates a block diagram of a heat pump system for a vehicle according to an embodiment of the present disclosure.

An embodiment of the present disclosure will hereinafter be described in detail with reference to the accompanying drawings.

Since the embodiment described in the specification and the configurations shown in the drawings are merely the most preferable embodiment and configurations of the present disclosure, they do not represent all of the technical ideas of the present disclosure, and it should be understood that that various equivalents and modified examples, which may replace the embodiments, are possible when filing the present application.

In order to clearly describe the present disclosure, parts that are irrelevant to the description are omitted, and identical or similar constituent elements throughout the specification are denoted by the same reference numerals.

Since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

Moreover, throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a unit of a comprehensive configuration having at least one function or operation.

FIG. 1 illustrates a block diagram of a heat pump system for a vehicle according to an embodiment of the present disclosure.

A heat pump system for a vehicle according to an embodiment of the present disclosure may control a temperature of a battery module (not shown) by using a first chiller 40 in which a refrigerant and a coolant are heat-exchanged, and may improve heating efficiency by using a second chiller 50 that recovers waste heat from electrical components (not shown).

Here, in the heat pump system, a coolant circulation device 3 that supplies a coolant to the electrical components and the battery module in an electric vehicle, and an air conditioner 10 for cooling and heating an interior, may be interlocked.

That is, referring to FIG. 1, the heat pump system may include the coolant circulation device 3, the air conditioner 10, the first chiller 40, and the second chiller 50.

First, the coolant circulation device 3 circulates a coolant through a coolant line 5. The coolant circulation device 3 may be connected to the electrical components and the battery module, which are not shown, through the coolant line 5.

In addition, the coolant circulation device 3 may include a radiator, a water pump, and a reservoir tank, which are not shown.

The electrical components (not shown) may include a power conversion device such as an electric power control unit (EPCU), a motor, an inverter, and an on board charger (OBC), and an autonomous driving controller.

The electrical components as described above may be connected to the coolant line 5 to be cooled by water cooling.

That is, when the waste heat of the electrical components (not shown) is recovered in the heating mode of the vehicle, the heat generated from the power conversion device such as the EPCU, the motor, the inverter, or the OBC may be recovered.

The coolant circulation device 3 circulates the coolant cooled by the radiator along the coolant line 5 through an operation of a water pump, thereby cooling the electrical components (not shown) or the battery module (not shown) to not overheat.

In the present embodiment, the air conditioner 10 includes an HVAC (heating, ventilation, and air conditioning) module 12, a condenser 13, a heat-exchanger 14, a first expansion valve 15, an evaporator 16, and an accumulator 17, a compressor 19, a first refrigerant connection line 21, a second refrigerant connection line 22, and a second expansion valve 23, which are connected through a refrigerant line 11.

First, the HVAC module 12 includes the evaporator 16 connected thereto through the refrigerant line 11, and an opening/closing door 12b for controlling the external air passing through the evaporator 16 to selectively flow into a heater 12a according to the cooling, heating, and dehumidifying modes of the vehicle.

That is, the opening/closing door 12b is opened so that the external air that has passed through the evaporator 16 flows into the heater 12a in the heating mode of the vehicle.

In contrast, in the cooling mode of the vehicle, the opening/closing door 12b closes the heater 12a side so that the external air cooled while passing through the evaporator 16 directly flows into the vehicle.

In the present embodiment, the condenser 13 is connected to the refrigerant line 11 so that the refrigerant passes therethrough. The condenser 13 may be connected to the coolant circulation device 3 through the coolant line 5.

That is, the condenser 13 may condense the refrigerant through heat-exchange with the coolant supplied through the coolant line 5. That is, the condenser 13 may be a water-cooled heat-exchanger into which a coolant flows.

The condenser 13 configured as described above may heat-exchange the refrigerant supplied from the compressor 19 with the coolant supplied from the coolant circulation device 3 to condense the refrigerant.

In the present embodiment, the heat-exchanger 14 may be provided in the refrigerant line 11 between the condenser 13 and the evaporator 16.

The first expansion valve 15 is provided in the refrigerant line 11 between the heat-exchanger 14 and the evaporator 16. The first expansion valve 15 receives the refrigerant passed through the heat-exchanger 14 to expand the refrigerant.

The accumulator 17 is provided in the refrigerant line 11 between the evaporator 16 and the compressor 19.

The accumulator 17 improves efficiency and durability of the compressor 19 by supplying only the gaseous refrigerant to the compressor 19.

In the present embodiment, one end of the first refrigerant connection line 21 is connected to the refrigerant line 11 between the heat-exchanger 14 and the first expansion valve 15. In addition, the other end of the first refrigerant connection line 21 may be connected to the refrigerant line 11 between the evaporator 16 and the accumulator 17.

Meanwhile, the second expansion valve 23 may be provided in the first refrigerant connection line 21.

The second expansion valve 23 may selectively expand the refrigerant that has passed through the heat-exchanger 14 according to a vehicle mode to flow the refrigerant into the first refrigerant connection line 21 or pass it through the first refrigerant connection line 21.

When the battery module (not shown) is cooled by using the coolant heat-exchanged with the refrigerant, the second expansion valve 23 expands the refrigerant introduced through the first refrigerant connection line 21 to flow it into the first chiller 40.

That is, the second expansion valve 23 expands the refrigerant discharged from the heat-exchanger 14 to lower the temperature thereof and flows it into the first chiller 40 or the second chiller 50, so that the water temperature of the coolant passing through the inside of the first chiller 40 or the second chiller 50 may be further reduced.

Accordingly, the coolant whose water temperature is lowered while passing through the first chiller 40 may flow into and cool the battery module (not shown).

In addition, when recovering waste heat from the electrical components (not shown) in the vehicle's heating mode or dehumidifying mode, the second expansion valve 23 may selectively expand or not expand the refrigerant to flow the refrigerant into the first refrigerant connection line 21.

Meanwhile, one end of the second refrigerant connection line 22 is connected to the first refrigerant connection line 21 between the second expansion valve 23 and the first chiller 40 through a refrigerant valve 24 so that the refrigerant that has passed through the heat-exchanger 14 passes through the second chiller 50.

In addition, the other end of the second refrigerant connection line 22 may be connected to the accumulator 17.

In the present embodiment, the second refrigerant connection line 22 is selectively opened and closed by the refrigerant valve 24, and the second refrigerant connection line 22 may supply the refrigerant expanded in the second expansion valve 23 to the second chiller 50.

That is, when the battery module is cooled by using the first chiller 40, or when the waste heat is recovered from the electrical components by using the second chiller 50, the refrigerant valve 24 may selectively open and close the first refrigerant connection line 21 and the second refrigerant connection line 22.

Accordingly, the first and second refrigerant connection lines 21 and 22 may both be opened or closed depending on the operation of the refrigerant valve 24, and only a selected line may be opened and closed individually.

In addition, the refrigerant expanded by the second expansion valve 23 may be selectively supplied to the first and second chillers 40 and 50 through the first refrigerant connection line 21 or the second refrigerant connection line 22 according to the operation of the refrigerant valve 24.

In addition, the compressor 19 is connected between the evaporator 16 and the condenser 13 through the refrigerant line 11. The compressor 19 may compress the gaseous refrigerant, and may supply the compressed refrigerant to the condenser 13.

Meanwhile, in the present embodiment, the heat pump system may further include a gas injection part 30.

The gas injection part 30 is provided in the air conditioner 10. The gas injection part 30 may bypass some of the refrigerant that has passed through the condenser 13 to the compressor 19 to increase the flow rate of the refrigerant circulating in the refrigerant line 11.

The gas injection part 30 configured as described above may be selectively operated in the heating or dehumidifying mode of the vehicle.

Conversely, the gas injection part 30 may be stopped in the cooling mode of the vehicle.

Here, the gas injection part 30 includes a gas-liquid separator 31, a supply line 32, a control valve 33, a third expansion valve 34, and a fourth expansion valve 35.

First, the gas-liquid separator 31 is provided in the refrigerant line 11 between the condenser 13 and the heat-exchanger 14.

The gas-liquid separator 31 may separate gaseous refrigerant and liquid refrigerant of the refrigerant completely heat-exchanged while passing through the condenser 13 to selectively discharge them.

The supply line 32 connects the gas-liquid separator 31 and the compressor 19. The supply line 32 may selectively supply the gaseous refrigerant from the gas-liquid separator 31 to the compressor 19.

That is, the supply line 32 may connect the gas-liquid separator 31 and the compressor 19 so that the gaseous refrigerant that has passed through the gas-liquid separator 31 may selectively flow into the compressor 19.

In the present embodiment, the control valve 33 is provided in the supply line 32. The control valve 33 may selectively open the supply line 32 according to the vehicle mode.

That is, the control valve 33 may be operated so that the supply line 32 may be opened when the gas injection part 30 is operated.

Here, the gas-liquid separator 31 may supply the gaseous refrigerant to the compressor 19 through the supply line 32 opened by the operation of the control valve 33. In addition, the gas-liquid separator 31 may supply a liquid refrigerant to the heat-exchanger 14.

The third expansion valve 34 is provided in the refrigerant line 11 between the condenser 13 and the gas-liquid separator 31.

In addition, the fourth expansion valve 35 may be provided in the refrigerant line 11 between the gas-liquid separator 31 and the heat-exchanger 14.

That is, when the gas injection part 30 is operated in the heating mode of the vehicle, the third expansion valve 34 may expand the refrigerant supplied from the condenser 13 to supply it to the gas-liquid separator 31.

In addition, the fourth expansion valve 35 may expand the refrigerant supplied from the gas-liquid separator 31 to flow into the refrigerant line 11.

Conversely, when the gas injection part 30 is not operated in the heating mode of the vehicle, the third expansion valve 34 may pass the refrigerant supplied from the condenser 13.

In addition, the fourth expansion valve 35 may expand the refrigerant passed through the gas-liquid separator 31 to supply it to the heat-exchanger 14.

Meanwhile, when the gas injection part 30 is operated in the dehumidifying mode of the vehicle, the third expansion valve 34 may expand the refrigerant supplied from the condenser 13 to supply it to the gas-liquid separator 31.

In addition, the fourth expansion valve 35 may selectively expand or pass the refrigerant that has passed the gas-liquid separator 31 depending on the presence or absence of refrigerant expansion of the first expansion valve 15.

Conversely, when the gas injection part 30 is not operated in the dehumidifying mode of the vehicle, the third expansion valve 34 may pass the refrigerant supplied from the condenser 13.

In addition, the fourth expansion valve 35 may pass the refrigerant passed through the gas-liquid separator 31 to supply it to the heat-exchanger 14.

In addition, in the cooling mode of the vehicle, the third and fourth expansion valves 34 and 35 may not expand the refrigerant supplied from the condenser 13 but flow it through the refrigerant line 11.

Here, the heat-exchanger 14 may selectively condense or evaporate the refrigerant that has passed through the condenser 13 according to whether the gas injection part 30 is operated.

Specifically, the heat-exchanger 14 additionally condenses or evaporates the refrigerant discharged from the gas-liquid separator 31 through heat-exchange with the external air according to the selective operation of the fourth expansion valve 35.

When the heat-exchanger 14 condenses the refrigerant, the heat-exchanger 14 further condenses the refrigerant condensed in the condenser 13, so that it may increase sub-cooling of the refrigerant, thus a coefficient of performance (COP), which is a coefficient of cooling capacity to required power of a compressor, may be improved.

Meanwhile, the gas injection part 30 may further include a separate connection line (not shown) that has one end connected to the refrigerant line 11 between the condenser 13 and the third expansion valve 34, and the other end connected to the refrigerant line 11 that is connected to the heat-exchanger 14.

A separate on-off valve (not shown) may be provided in the separate connection line (not shown).

That is, in the cooling mode of the vehicle, the connection line (not shown) is opened by the on-off valve, and in this case, the refrigerant that has passed through the condenser 13 may be directly supplied to the heat-exchanger 14 without passing through the gas injection part 30.

Accordingly, cooling performance may be improved by reducing the pressure of the refrigerant circulating along the refrigerant line 11 in the cooling mode of the vehicle.

In the present embodiment, the first chiller 40 is connected to the coolant circulation device 3 through the coolant line 5, and the coolant may be selectively circulated therein.

The first chiller 40 is connected to the refrigerant line 11 through the first refrigerant connection line 21. That is, the first chiller 40 may be a water-cooled heat-exchanger into which a coolant flows.

Accordingly, the first chiller 40 heat-exchanges the coolant selectively flowing through the coolant line 5 with the refrigerant selectively supplied from the air conditioner 10 to control the temperature of the coolant.

The second chiller 50 is connected to the coolant circulation device 3 through the coolant line 5, and the coolant may be selectively circulated therein.

The second chiller 50 is connected to the second refrigerant connection line 22 so that the refrigerant is supplied from the air conditioner 10. That is, the second chiller 50 may increase the temperature of the coolant by heat-exchanging the coolant and the refrigerant so as to recover waste heat from the coolant selectively flowing into the inside of the second chiller 50.

That is, the second chiller 50 may increase the temperature of the refrigerant by absorbing the waste heat generated from the electrical components. Here, the second chiller 50 may be a water-cooled heat-exchanger into which a coolant flows.

In the present embodiment, the first, second, third, and fourth expansion valves 15, 23, 34, and 35 may be electronic expansion valves that selectively expand the refrigerant while controlling the flow of the refrigerant passing through the refrigerant line 11 or the first refrigerant connection line 21.

Meanwhile, a gas injection part 130 according to another embodiment of the present disclosure will be described with reference to FIG. 2.

Figure 2:
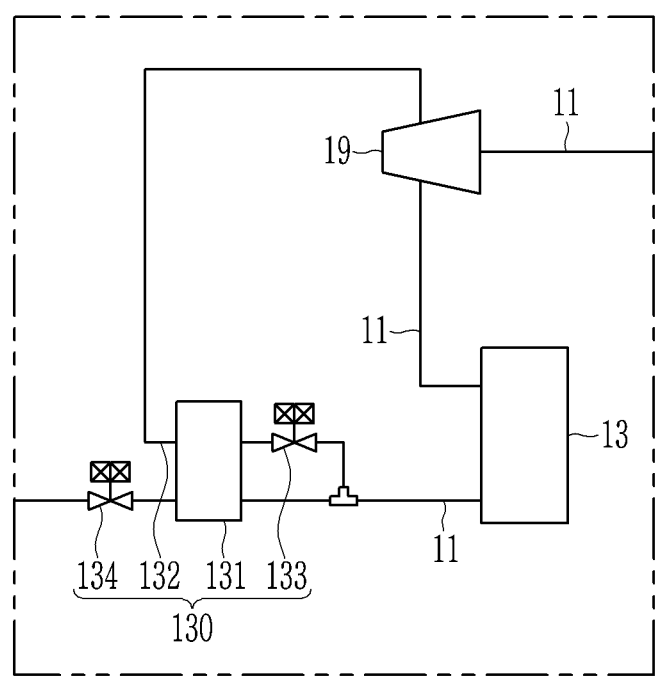
FIG. 2 illustrates a block diagram of a gas injection part applied to a heat pump system for a vehicle according to another embodiment of the present disclosure.

FIG. 2 illustrates a block diagram of a gas injection part applied to a heat pump system for a vehicle according to another embodiment of the present disclosure.

Referring to FIG. 2, the gas injection part 130 according to another embodiment of the present disclosure is provided in the air conditioner 10.

Here, the gas injection part 130 may include a plate-shaped heat-exchanger 131, a supply line 132, a third expansion valve 133, and a fourth expansion valve 134.

First, the plate-shaped heat-exchanger 131 may be provided in the refrigerant line 11 between the condenser 13 and the heat-exchanger 14.

One end of the supply line 132 is connected to the refrigerant line 11 between the condenser 13 and the plate-shaped heat-exchanger 131.

The other end of the supply line 132 may be connected to the compressor 19 through the plate-shaped heat-exchanger 131.

That is, some of the refrigerant that has passed through the condenser 13 may flow into the supply line 132 and the remaining refrigerant thereof may flow into the plate-shaped heat-exchanger 131 through the refrigerant line 11.

The third expansion valve 133 may be provided in the supply line 132 at a front end of the plate-shaped heat-exchanger 131.

The third expansion valve 133 may selectively open and close the supply line 132 according to whether the gas injection part 130 is operated, and at the same time, expand the refrigerant flowing into the supply line 132.

In addition, the fourth expansion valve 134 may be provided in the refrigerant line 11 between the plate-shaped heat-exchanger 131 and the heat-exchanger 14.

Here, the third expansion valve 133 may expand the refrigerant flowing into the supply line 132 through the condenser 13 in the heating or dehumidifying mode of the vehicle to supply it to the plate-shaped heat-exchanger 131.

The plate heat-exchanger 131 may heat-exchange the refrigerant flowing into the supply line 132 and expanded through the operation of the third expansion valve 133 with the refrigerant discharged from the condenser 13.

Then, the supply line 132 may selectively supply a gaseous refrigerant among the refrigerant heat-exchanged while passing through the plate-shaped heat-exchanger 131 to the compressor 19.

The operation of the gas injection part 130 configured as described above is as follows.

First, some of the refrigerant that has passed through the condenser 13 flows into the supply line 132 according to the operation of the third expansion valve 133.

The refrigerant flowing into the supply line 132 is expanded through the operation of the third expansion valve 133, and the expanded refrigerant enters a gaseous state while being heat-exchanged with the remaining refrigerant flowing through the refrigerant line 11 from the condenser 13 by the plate-shaped heat-exchanger 131.

The gaseous refrigerant is supplied to the compressor 19 through the opened supply line 132.

That is, the gas injection part 130 flows the gaseous refrigerant heat-exchanged while passing through the plate-shaped heat-exchanger 131 back into the compressor 19 through the supply line 132, thereby increasing the flow rate of the refrigerant circulating in the refrigerant line 11.

On the other hand, the fourth expansion valve 134 may expand the refrigerant passing through the plate-shaped heat-exchanger 131 to flow it into the refrigerant line 11, regardless of whether the gas injection part 30 is operated in the vehicle heating mode.

In addition, when the gas injection part 130 is operated in the dehumidifying mode of the vehicle, the fourth expansion valve 134 may selectively expanded or pass the refrigerant passing through the plate-shaped heat-exchanger 131 depending on the presence or absence of refrigerant expansion of the first expansion valve 15.

Conversely, when the gas injection part 130 is not operated in the dehumidifying mode of the vehicle, the fourth expansion valve 35 may pass the refrigerant passing through the gas-liquid separator 31 to supply it to the heat-exchanger 14.

In addition, in the cooling mode of the vehicle, the fourth expansion valve 134 may not expand the refrigerant supplied from the condenser 13, but flow it through the refrigerant line 11.

Hereinafter, an operation and action of the heat pump system for the vehicle according to the embodiment of the present disclosure configured as described above will be described in detail with reference to FIG. 3 to FIG. 5.

First, an operation for cooling a battery module (not shown) in the vehicle cooling mode will be described with reference to FIG. 3.

Figure 3:
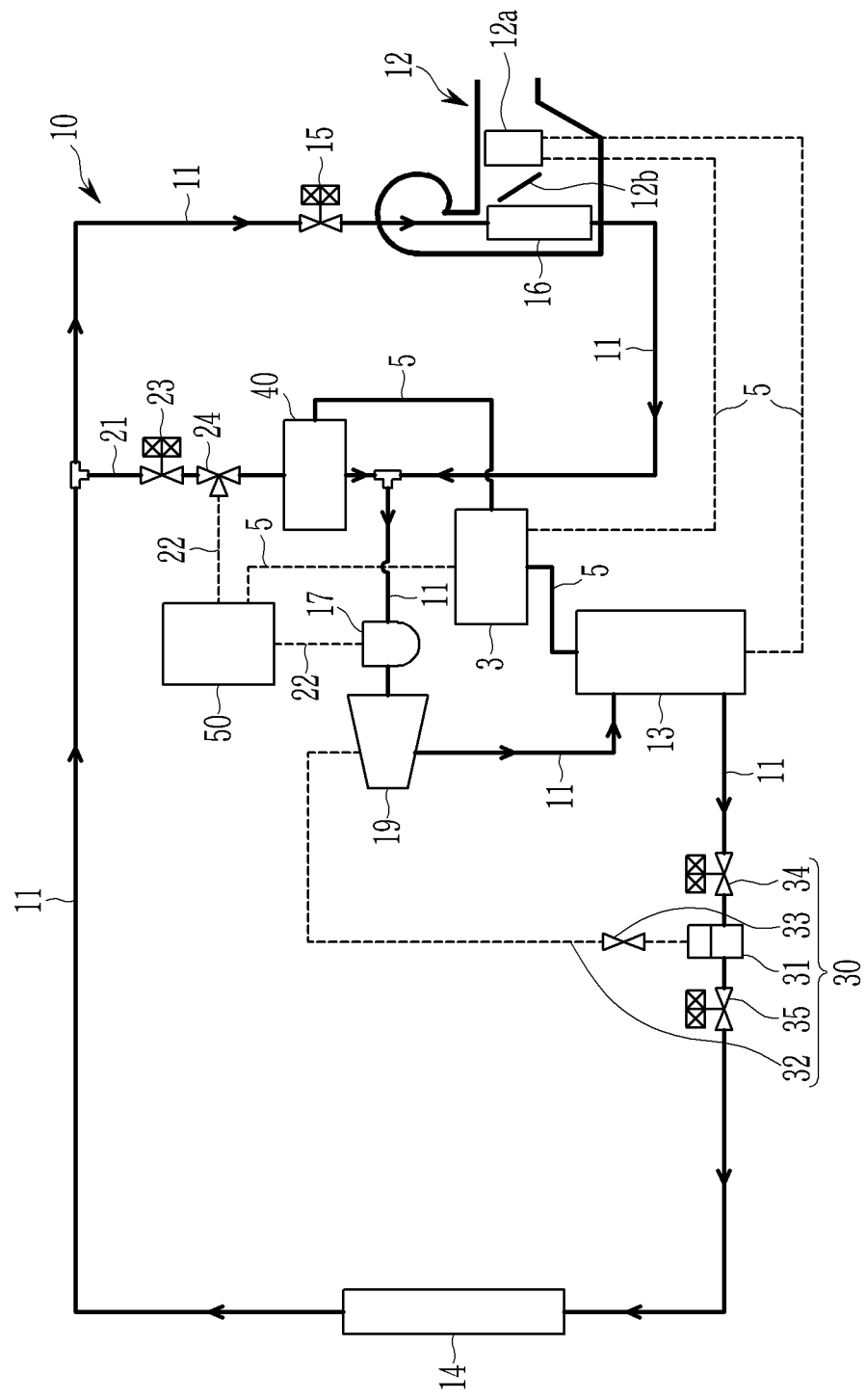
FIG. 3 illustrates an operational state diagram of cooling a battery module by using a refrigerant in a vehicle cooling mode in a heat pump system for a vehicle according to an embodiment of the present disclosure.

FIG. 3 illustrates an operational state diagram of cooling a battery module by using a refrigerant in a vehicle cooling mode in a heat pump system for a vehicle according to an embodiment of the present disclosure.

Referring to FIG. 3, the coolant circulation device 3 supplies the coolant to the condenser 13 and the first chiller 40 through the coolant line 5 connected to the condenser 13 and the first chiller 40.

In the air conditioner 10, respective constituent elements thereof operate to cool the interior of the vehicle. Accordingly, the refrigerant is circulated along the refrigerant line 11.

Here, the refrigerant line 11 connecting the heat-exchanger 14 and the evaporator 16 is opened through the operation of the first expansion valve 15. The first refrigerant connection line 21 is opened through the operation of the second expansion valve 23 and the refrigerant valve 24.

In addition, the second refrigerant connection line 22 is closed through the operation of the refrigerant valve 24.

Then, the refrigerant that has passed through the heat-exchanger 14 may be circulated along the refrigerant line 11 and the first refrigerant connection line 21.

Here, the first and second expansion valves 15 and 23 may expand the refrigerant so that the expanded refrigerant may be supplied to the evaporator 16 and the first chiller 40, respectively.

In addition, the heat-exchanger 14 may further condense the refrigerant introduced from the condenser 13 through heat-exchange with outside air.

Meanwhile, the coolant passing through the first chiller 40 may cool the battery module connected to the coolant circulation device 3.

That is, the coolant passing through the first chiller 40 is cooled through heat-exchange with refrigerant supplied to the first chiller 40. The coolant cooled by the first chiller 40 is supplied to the battery module. Accordingly, the battery module may be efficiently cooled by the cooled coolant.

That is, the second expansion valve 23 expands some of the refrigerant that has passed through the heat-exchanger 14 so that the expanded refrigerant is supplied to the first chiller 40. At the same time, the refrigerant valve 24 may open the first refrigerant connection line 21 and close the second refrigerant connection line 22.

Therefore, some of the refrigerant discharged from the heat-exchanger 14 is expanded through the operation of the second expansion valve 23 to enter a low temperature and low pressure state, and flows into the first chiller 40 connected to the first refrigerant connection line 21.

Then, the refrigerant flowing into the first chiller 40 is heat-exchanged with the coolant, passes through the accumulator 17 through the refrigerant line 11 connected to the first refrigerant connection line 21, and then flows into the compressor 19.

Meanwhile, the remaining refrigerant discharged from the heat-exchanger 14 flows through the refrigerant line 11 to cool the interior of the vehicle, and sequentially passes through the first expansion valve 15, the evaporator 16, the accumulator 17, the compressor 19, and the condenser 13.

Here, the outside air flowing into the HVAC module 12 is cooled while passing through the evaporator 16 by the low-temperature refrigerant flowing into the evaporator 16.

In this case, the opening/closing door 12b closes parts passing through the heater 12a so that cooled outside air does not pass through the heater 12a. Accordingly, the cooled outside air directly flows into the interior of the vehicle, thereby cooling the vehicle interior.

Meanwhile, the refrigerant with a condensation amount that is increased while sequentially passing through the condenser 13 and the heat-exchanger 14 is expanded and supplied to the evaporator 16, so that the refrigerant may be evaporated at a lower temperature.

That is, in the present embodiment, the condenser 13 condenses the refrigerant, and the heat-exchanger 14 additionally condenses the refrigerant, thereby advantageously performing sub-cooling of the refrigerant.

In addition, as the refrigerant in which the sub-cooling is performed is evaporated at a lower temperature in the evaporator 16, the temperature of the outside air passing through the evaporator 16 may be further lowered, thereby improving cooling performance and efficiency.

Meanwhile, the operation of the gas injection part 30 stops. Here, the refrigerant discharged from the condenser 13 may be supplied to the heat-exchanger 14 without expansion in the third and fourth expansion valves 34 and 35.

While repeating the above-described process, the refrigerant may cool the interior in the cooling mode of the vehicle, and at the same time, it may cool the coolant through heat-exchange while passing through the first chiller 40.

The low-temperature coolant cooled by the first chiller 40 flows into the battery module. Accordingly, the battery module may be efficiently cooled by the supplied low-temperature coolant.

In the present embodiment, an operation of recovering heat from the external heat source and waste heat from the electrical components in the heating mode of the vehicle will be described with reference to FIG. 4.

Figure 4:
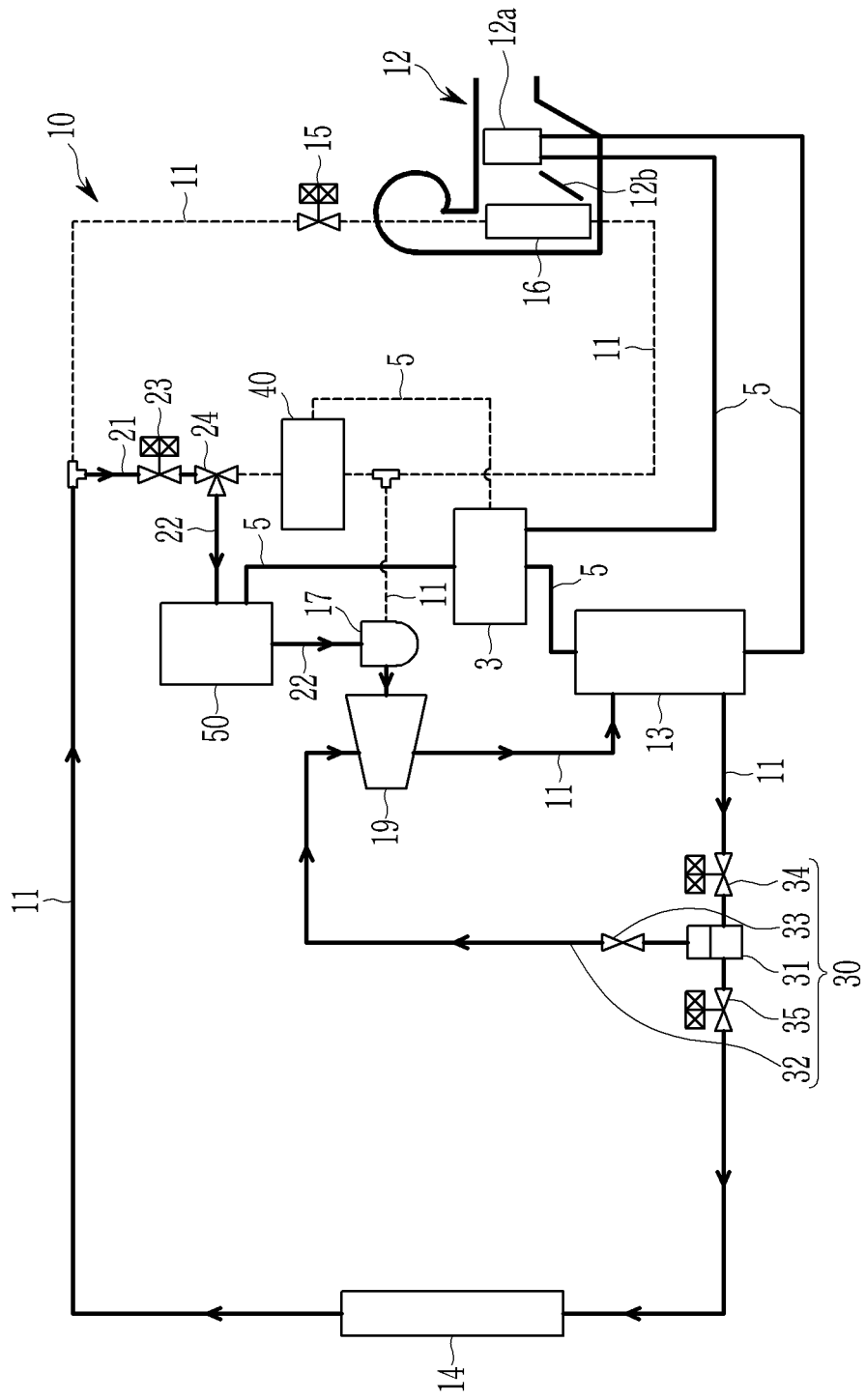
FIG. 4 illustrates an operational state diagram for recovering heat from an external heat source and waste heat of an electrical component according to a heating mode in a heat pump system for a vehicle according to an embodiment of the present disclosure.

FIG. 4 illustrates an operational state diagram for recovering heat from an external heat source and waste heat of electrical components according to a heating mode in a heat pump system for a vehicle according to an embodiment of the present disclosure.

Referring to FIG. 4, the heat pump system may absorb heat from the external heat source from the external air together with the waste heat of the electrical component 15 in the vehicle heating mode.

First, the coolant circulation device 3 supplies the coolant to the heater 12a, the condenser 13, and the second chiller 50 through the coolant line 5 connected to the heater 12a, the condenser 13, and the second chiller 50.

Here, the coolant having a temperature that is increased by absorbing waste heat from the electrical components may be supplied to the second chiller 50. That is, the waste heat generated from the electrical components increases the temperature of the coolant supplied to the second chiller 50.

Meanwhile, the coolant of which temperature is increased while passing through the second chiller 50 and the condenser 13 from the coolant circulation device 3 may be supplied to the heater 12a.

In the air conditioner 10, respective constituent elements thereof operate to heat the interior of the vehicle. Accordingly, the refrigerant is circulated along the refrigerant line 11.

Here, the refrigerant line 11 connecting the condenser 13 and the evaporator 16 is closed through the operation of the first expansion valve 15.

A portion of the first refrigerant connection line 21 is opened through the operation of the second expansion valve 23.

Here, a portion of the first refrigerant connection lines 21 connected to the first chiller 40 is closed through the operation of the refrigerant valve 24. At the same time, the second refrigerant connection line 22 is opened through the operation of the refrigerant valve 24.

The second expansion valve 23 may selectively expand the refrigerant and supply it to the second chiller 50.

That is, the second expansion valve 23 may pass the refrigerant through the second refrigerant connection line 22 when the gas injection part 30 is operated. Conversely, when the gas injection part 30 is not operated, the second expansion valve 23 may flow the refrigerant of an expanded state into the second refrigerant connection line 22.

Meanwhile, the fourth expansion valve 35 may expand the refrigerant passed through the gas-liquid separator 31 to supply it to the heat-exchanger 14.

Accordingly, the heat-exchanger 14 recovers heat from the external heat source while evaporating the expanded refrigerant through heat-exchange between the expanded refrigerant and the external air.

In addition, the coolant of which temperature is increased by absorbing the waste heat of the electrical components is recovered while passing through the second chiller 50 and increasing the temperature of the refrigerant supplied to the second chiller 50.

That is, the second chiller 50 receives the refrigerant that is supplied from the heat-exchanger 14 and expanded by the second expansion valve 23, through the second refrigerant connection line 22, and evaporates the supplied refrigerant through heat-exchange with the coolant of which temperature has risen while passing through the electrical components, thereby recovering the waste heat from the electrical components.

Then, the refrigerant that has passed through the second chiller 50 is supplied to the accumulator 17.

The refrigerant supplied to the accumulator 17 is separated into gas and liquid. The gaseous refrigerant of the refrigerant separated into gas and liquid is supplied to the compressor 19.

The refrigerant compressed at a high temperature and high pressure in the compressor 19 flows into the condenser 13.

Here, while being heat-exchanged with the coolant supplied through the coolant line 5, the refrigerant supplied to the condenser 13 may increase the temperature of the coolant. The coolant of which temperature has been increased is supplied to the heater 12a.

Meanwhile, the opening/closing door 12b is opened so that the external air that flows into the HVAC module 12 and then passes through the evaporator 16 passes through the heater 12a.

Accordingly, the external air flowing from the outside flows in the room temperature state in which it is not cooled when passing through the evaporator 16 to which no refrigerant is supplied. The flowed external air is converted to a high temperature state while passing through the heater 12a to flow into the vehicle interior, so that the vehicle interior may be heated.

Here, when the gas injection part 30 is operated, the supply line 32 is opened through the operation of the control valve 33.

In this state, the third expansion valve 34 expands the refrigerant supplied from the condenser 13 to supply it to the gas-liquid separator 31.

Among the refrigerant supplied to the gas-liquid separator 31, the gaseous refrigerant is supplied to the compressor 19 through the opened supply line 32.

That is, the gas injection part 30 flows the gaseous refrigerant heat-exchanged while passing through the gas-liquid separator 31 back into the compressor 19 through the supply line 32, thereby increasing the flow rate of the refrigerant circulating in the refrigerant line 11.

In addition, the liquid refrigerant discharged from the gas-liquid separator 31 through the refrigerant line 11 flows into the heat-exchanger 14 along the refrigerant line 11 opened through the operation of the fourth expansion valve 35.

In this case, the fourth expansion valve 35 may expand the refrigerant supplied from the gas-liquid separator 31.

That is, the gas-liquid separator 31 of the gas injection part 30 may bypass the gaseous refrigerant to the compressor 19 through the supply line 32, and may supply the liquid refrigerant to the fourth expansion valve 35.

Then, the refrigerant may be expanded while passing through the fourth expansion valve 35, and may be evaporated through heat-exchange with the external air in the heat-exchanger 14.

In addition, the refrigerant may smoothly recover the waste heat from the coolant of which temperature has risen while passing through the electrical components from the second chiller 50, thereby improving heating performance and efficiency.

That is, the heat pump system according to the present embodiment absorbs the external heat source in the heat-exchanger 14 when heating is required in an initial starting idle state (IDLE) state or in an initial running state of the vehicle, and it increases the temperature of the refrigerant by using the waste heat of the electrical components, so that the power consumption of the compressor 19 may be reduced, and the heating efficiency may be improved.

In addition, the present disclosure may improve heating efficiency and performance while minimizing a use amount of a separate electric heater.

Furthermore, the gas injection part 30 may maximize the heating performance by increasing the flow rate of the refrigerant circulating in the refrigerant line 11.

In the present embodiment, an operation for a dehumidifying mode of a vehicle will be described with reference to FIG. 5.

Figure 5:
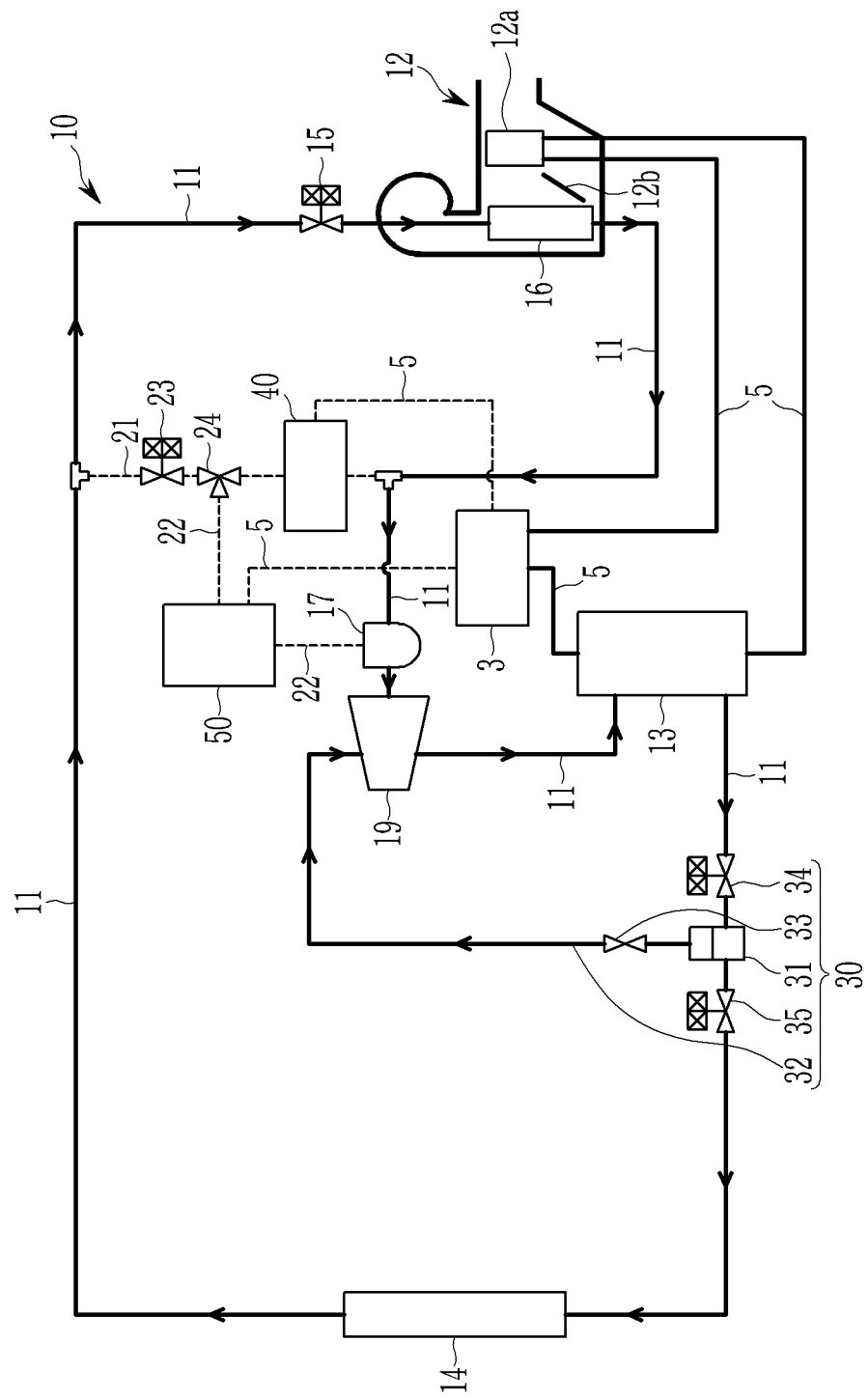
FIG. 5 illustrates an operational state diagram of a dehumidifying mode in a heat pump system for a vehicle according to an embodiment of the present disclosure.

FIG. 5 illustrates an operational state diagram of a dehumidifying mode in a heat pump system for a vehicle according to an embodiment of the present disclosure.

Referring to FIG. 5, the heat pump system may perform the dehumidifying mode while heating the vehicle interior.

First, the coolant circulation device 3 supplies the coolant to the heater 12a and the condenser 13 through the coolant line 5 connected to the heater 12a and the condenser 13.

Here, the coolant of which temperature is increased while passing through the condenser 13 from the coolant circulation device 3 may be supplied to the heater 12a.

Meanwhile, in the air conditioner 10, respective constituent elements thereof operate to heat and dehumidify the interior of the vehicle. Accordingly, the refrigerant is circulated along the refrigerant line 11.

The refrigerant line 11 connecting the heat-exchanger 14 and the evaporator 16 is opened by the first expansion valve 15.

The first refrigerant connection line 21 is closed by the second expansion valve 23. At the same time, in a state in which the second refrigerant connection line 22 is also closed, the refrigerant may circulate along the refrigerant line 11.

Here, the first expansion valve 15 may expand the refrigerant supplied to the refrigerant line 11 so that the expanded refrigerant may be supplied to the evaporator 16.

The expanded refrigerant supplied to the evaporator 16 through the operation of the first expansion valve 15 is heat-exchanged with the external air passing through the evaporator 16, and then is supplied to the accumulator 17 along the refrigerant line 11.

The refrigerant supplied to the accumulator 17 is separated into gas and liquid. The gaseous refrigerant of the refrigerant separated into gas and liquid is supplied to the compressor 19.

The refrigerant compressed at a high temperature and high pressure in the compressor 19 flows into the condenser 13.

Here, while being heat-exchanged with the coolant supplied through the coolant line 5, the refrigerant supplied to the condenser 13 may increase the temperature of the coolant. The coolant of which temperature has been increased is supplied to the heater 12a.

Here, the opening/closing door 12b is opened so that the external air that flows into the HVAC module 12 and then passes through the evaporator 16 passes through the heater 12a.

That is, the external air flowing into the HVAC module 12 is dehumidified while passing through the evaporator 16 by the low-temperature refrigerant flowing into the evaporator 16. Then, while passing through the heater 12a, it is converted into a high temperature state to flow into the interior of the vehicle, thereby heating and dehumidifying the interior of the vehicle.

Meanwhile, the gas injection part 30 may be selectively operated in the dehumidifying mode of the vehicle.

First, when the gas injection part 30 does not operate, the third and fourth expansion valves 34 and 35 do not expand the refrigerant supplied from the condenser 13 but supply it to the heat-exchanger 14.

Accordingly, the heat-exchanger 14 may condense the refrigerant through heat-exchange with the external air.

On the contrary, when the gas injection part 30 is operated, the supply line 32 is opened through the operation of the control valve 33.

In this state, the third expansion valve 34 expands the refrigerant supplied from the condenser 13 to supply it to the gas-liquid separator 31.

Among the refrigerant supplied to the gas-liquid separator 31, the gaseous refrigerant is supplied to the compressor 19 through the opened supply line 32.

That is, the gas injection part 30 flows the gaseous refrigerant heat-exchanged while passing through the gas-liquid separator 31 back into the compressor 19 through the supply line 32, thereby increasing the flow rate of the refrigerant circulating in the refrigerant line 11.

In addition, the liquid refrigerant discharged from the gas-liquid separator 31 through the refrigerant line 11 flows into the heat-exchanger 14 along the refrigerant line 11 opened through the operation of the fourth expansion valve 35.

In addition, the fourth expansion valve 35 may selectively expand or pass the refrigerant that has passed the gas-liquid separator 31 depending on the presence or absence of refrigerant expansion of the first expansion valve 15.

Accordingly, the heat-exchanger 14 may condense or evaporate the refrigerant through heat-exchange with the external air.

That is, the gas-liquid separator 31 of the gas injection part 30 may bypass the gaseous refrigerant to the compressor 19 through the supply line 32, and may supply the liquid refrigerant to the fourth expansion valve 35.

Then, the refrigerant may be selectively expanded while passing through the fourth expansion valve 35, and may be condensed or evaporated through heat-exchange with the external air in the heat-exchanger 14.

Accordingly, as described above, when the heat pump system for the vehicle according to the embodiment of the present disclosure is applied, simplification of the system may be realized, by using one first chiller 40 in which a refrigerant and a coolant are heat-exchanged to control a temperature of a battery module according to a vehicle mode.

In addition, according to the heat pump system for the vehicle according to the embodiment of the present disclosure, it is possible to improve heating efficiency by using the second chiller 50 as another chiller that recovers waste heat from electrical components in a vehicle heating mode and by selectively using an external heat source or the waste heat from the electrical components.

In addition, according to the embodiment of the present disclosure, by efficiently controlling a temperature of a battery module, it is possible to operate the battery module at optimal performance, and a total mileage of the vehicle may be increased through efficient management of the battery module.

In addition, according to the embodiment of the present disclosure, it is possible to maximize heating performance by selectively increasing a flow rate of refrigerant in a vehicle heating or dehumidifying mode by applying the gas injection part 30.

Furthermore, the present disclosure may reduce the manufacturing cost and weight through simplification of the entire system, and may improve space utilization.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

The invention claimed is:

1. A heat pump system for a vehicle, comprising:
an air conditioner circulating a refrigerant through a refrigerant line;
a coolant circulation device circulating a coolant through a coolant line;
a first chiller that is connected to the coolant circulation device through the coolant line, connected to the refrigerant line through a first refrigerant connection line, and heat-exchanges a selectively introduced coolant with a refrigerant supplied from the air conditioner to control a temperature of the coolant; and
a second chiller that is connected to the coolant circulation device through the coolant line, connected to a second refrigerant connection line so that a refrigerant is supplied from the air conditioner, and increases a temperature of the refrigerant by heat-exchanging the coolant and the refrigerant so that waste heat is recovered from the coolant selectively flowing thereinto,
wherein the air conditioner includes a gas injection part that bypasses some of the refrigerant passing through a condenser to a compressor to increase a flow rate of the refrigerant circulating in the refrigerant line; and
wherein the air conditioner includes:
an HVAC module including an evaporator connected thereto through the refrigerant line, and a door that selectively flows external air passing through the evaporator into a heater according to cooling, heating, and dehumidifying modes of the vehicle;
the condenser that is connected to the coolant circulation device through the coolant line so that the coolant passes, and heat-exchanges the refrigerant supplied through the refrigerant line with the coolant;
a compressor connected between the evaporator and the condenser through the refrigerant line;
a heat-exchanger provided in the refrigerant line between the condenser and the evaporator;
a first expansion valve provided in the refrigerant line connecting the heat-exchanger and the evaporator;
a second expansion valve provided in the first refrigerant connection line; and
an accumulator provided in the refrigerant line between the evaporator and the compressor.

2. The heat pump system for the vehicle of claim 1, wherein:
one end of the first refrigerant connection line is connected to the refrigerant line between the heat-exchanger and the first expansion valve;
an other end of the first refrigerant connection line is connected to the refrigerant line between the accumulator and the evaporator;
one end of the second refrigerant connection line is connected to the first refrigerant connection line through the refrigerant valve between the second expansion valve and the first chiller so that the refrigerant that has passed the heat-exchanger passes through the second chiller; and
an other end of the second refrigerant connection line is connected to the accumulator.

3. The heat pump system for the vehicle of claim 1, wherein the second expansion valve selectively expands the refrigerant that has passed through the heat-exchanger according to a mode of the vehicle to flow the refrigerant into the first refrigerant connection line or to pass the refrigerant through the first refrigerant connection line.

4. The heat pump system for the vehicle of claim 2, wherein the gas injection part includes:
- a gas-liquid separator provided in the refrigerant line between the condenser and the heat-exchanger, the gas-liquid separator being configured to separate and selectively discharge a gaseous refrigerant and a liquid refrigerant among the refrigerant that have passed through the condenser;
- a supply line connecting the gas-liquid separator and the compressor, the supply line being configured to selectively supply the gaseous refrigerant from the gas-liquid separator to the compressor;
- a control valve provided in the supply line;
- a third expansion valve provided in the refrigerant line between the condenser and the gas-liquid separator; and
- a fourth expansion valve provided in the refrigerant line between the gas-liquid separator and the exchanger.

5. The heat pump system for the vehicle of claim 4, wherein when the gas injection part is operated in a heating mode of the vehicle,
the third expansion valve expands the refrigerant supplied from the condenser to supply the refrigerant to the gas-liquid separator; and
the fourth expansion valve expands the refrigerant supplied from the gas-liquid separator to flow the refrigerant into the refrigerant line.

6. The heat pump system for the vehicle of claim 4, wherein:
when the gas injection part is not operated in a heating mode of the vehicle,
the third expansion valve passes the refrigerant supplied from the condenser; and
the fourth expansion valve expands the refrigerant that has passed through the gas-liquid separator to supply the refrigerant to the heat-exchanger.

7. The heat pump system for the vehicle of claim 4, wherein when the gas injection part is not operated in a dehumidifying mode of the vehicle,
the third expansion valve passes the refrigerant supplied from the condenser, and
the fourth expansion valve passes the refrigerant that has passed through the gas-liquid separator to supply the refrigerant to the heat-exchanger.

8. The heat pump system for the vehicle of claim 4, wherein when the gas injection part is operated in a dehumidifying mode of the vehicle,
the third expansion valve expands the refrigerant supplied from the condenser to supply the refrigerant to the gas-liquid separator; and
the fourth expansion valve selectively expands or passes the refrigerant that has passed through the gas-liquid separator according to presence or absence of refrigerant expansion in the first expansion valve.

9. The heat pump system for the vehicle of claim 4, wherein in a cooling mode the vehicle, the third and fourth expansion valves do not expand the refrigerant supplied from the condenser, but flow the refrigerant through the refrigerant line.

10. The heat pump system for the vehicle of claim 4, wherein the control valve, when the gas injection part is operated, operates so that the supply line is opened.

11. The heat pump system for the vehicle of claim 4, wherein the first, second, third, and fourth expansion valves are electronic expansion valves that selectively expand the refrigerant while controlling flowing of the refrigerant.

12. The heat pump system for the vehicle of claim 4, wherein the heat-exchanger condenses or evaporates the refrigerant condensed in the condenser through heat-exchange with external air, according to a selective operation of the fourth expansion valve.

13. The heat pump system for the vehicle of claim 4, wherein when a battery module is cooled in a cooling mode of the vehicle:
the coolant circulation device supplies the coolant to the condenser and the first chiller through the coolant line connected to the condenser and the first chiller;
in the air conditioner,
in a state in which, through operations of the second expansion valve and the refrigerant valve, the first refrigerant connection line is opened and the second refrigerant connection line is closed, the refrigerant is circulated along the refrigerant line and the first refrigerant connection line;
the first and second expansion valves expand the coolant so that an expanded refrigerant is supplied to the evaporator and the first chiller, respectively; and
the heat-exchanger condenses the refrigerant through heat-exchange with external air.

14. The heat pump system for the vehicle of claim 4, wherein when recovering heat from an external heat source and waste heat from electrical components in a heating mode of the vehicle:
the coolant circulation device supplies the coolant to the heater, the condenser, and the second chiller through the coolant line connected to the heater, the condenser, and the second chiller;
the heater is supplied with a coolant of increased temperature while passing through the second chiller and the condenser from the coolant circulation device;
in the air conditioner, a refrigerant line connecting the heat-exchanger and the evaporator is closed by the first expansion valve;
a portion of the first refrigerant connection line connected to the first chiller is closed by the refrigerant valve, and the second refrigerant connection line is opened by the refrigerant valve;
the second expansion valve selectively expands the refrigerant to supply the refrigerant to the second chiller;
the heat-exchanger evaporates the refrigerant through heat-exchange with external air; and
the gas injection part is selectively operated.

15. The heat pump system for the vehicle of claim 4, wherein in a dehumidifying mode of the vehicle:
the coolant circulation device supplies the coolant to the heater and the condenser through the coolant line connected to the heater and the condenser;
the heater is supplied with a coolant of increased temperature while passing through the condenser from the coolant circulation device;
in the air conditioner,
in a state in which, through an operation of the second expansion valve, the first refrigerant connection line is closed and the second refrigerant connection line is closed, the refrigerant is circulated along the refrigerant line;
the first expansion valve expands the refrigerant so that the expanded refrigerant is supplied to the evaporator; and
the gas injection part is selectively operated.

16. The heat pump system for the vehicle of claim 15, wherein the heat-exchanger selectively condenses or evaporates the refrigerant that has passed the condenser according to whether the gas injection part is operated.

17. The heat pump system for the vehicle of claim 1, wherein the gas injection part includes:
- a plate-shaped heat-exchanger provided in the refrigerant line between the condenser and the heat-exchanger;
- a supply line that includes one end connected to the refrigerant line between the condenser and the plate-shaped heat-exchanger, and an other end connected to the compressor through the plate-shaped heat-exchanger;
- a third expansion valve provided in the supply line at a front end of the plate-shaped heat-exchanger; and
- a fourth expansion valve provided in the refrigerant line between the plate-shaped heat-exchanger and the heat-exchanger.

18. The heat pump system for the vehicle of claim 1, wherein the condenser is a water-cooled heat-exchanger; and
the heat-exchanger is an air-cooled heat-exchanger.

19. The heat pump system for the vehicle of claim 1, wherein the gas injection part selectively operates in a heating or dehumidifying mode of the vehicle.

* * * * *